United States Patent [19]
Paul

[11] 4,199,102
[45] Apr. 22, 1980

[54] TEMPERATURE CONTROL SYSTEM

[75] Inventor: Steven W. Paul, Laurel, Iowa

[73] Assignee: Dunham-Bush, Inc., West Hartford, Conn.

[21] Appl. No.: 922,141

[22] Filed: Jul. 5, 1978

[51] Int. Cl.² .................... F24D 1/00; G05D 23/24
[52] U.S. Cl. ............................ 236/91 G; 73/342; 165/28; 323/69
[58] Field of Search ............... 236/37, 91 R, 91 G; 165/28; 323/69; 73/342; 237/9 R

[56] References Cited

U.S. PATENT DOCUMENTS

| | | | |
|---|---|---|---|
| 2,282,442 | 5/1942 | Whitlock | 236/37 X |
| 2,362,977 | 11/1944 | Crosthwait, Jr. et al. | 236/37 X |
| 3,054,562 | 9/1962 | Werts | 236/91 G |

*Primary Examiner*—William E. Wayner

*Attorney, Agent, or Firm*—Sughrue, Rothwell, Mion, Zinn and Macpeak

[57] ABSTRACT

A temperature control system for monitoring and controlling a zone supplied with low-pressure steam is disclosed. The system utilizes a series of balanced Wheatstone bridges to provide a variety of automatic and manual control techniques to maintain temperature in the zone. Means are also provided to obtain direct readings of temperature, rate at which heat is being supplied, and the position and movement of a steam control valve which is utilized as a heat metering apparatus. The bridge leg outputs are permanently connected by high impedance coupling circuits which act as voltage dividers to obtain the required resultant control signals. High impedance coupling eliminates the need for control circuit balancing, thereby minimizing required calibrations in actual field use. The sole balancing calibration is with each sensor leg to a centered bridge leg.

13 Claims, 2 Drawing Figures

TEMPERATURE CONTROL SYSTEM

BACKGROUND OF THE INVENTION

1. Field of the Invention

This invention relates to a resistance-type temperature control system and, in particular, a system utilizing a number of condition responsive elements as part of a high impedance network adapted to control the temperature within a zone.

2. Prior Art

Various systems operating on resistance thermometer principles to control the temperature in buildings utilizing low-pressure steam are well known and documented in the prior art. Typical are systems which are described in U.S. Pat. Nos. 2,362,977 and 2,431,790. Those two patents describe a system which utilizes as a demand sensor a temperature-sensitive resistance thermometer mounted on the inside surface of a pane of window glass in the environmental area to be controlled. Control circuitry is described which reacts to the inner surface temperature of the glass to measure the heat requirements of that area as determined primarily by prevailing outdoor conditions as well as inside air temperature and the mean radiant temperature of interior parts of the zone to be controlled. Those patents disclose the use of a pair of temperature-sensitive resistances, one mounted below and the other above the heating element in a convector type of heating unit. This heat supply sensor reacts to the rise in temperature of the airstream passing through the heating element as a measure of the rate of heat output from the heating system. A mechanically-operated potentiometer which is in synchronism with the heat control valve is utilized as feedback to the controls which adjust the motor to operate the control valve. Accordingly, in those patents, the system utilizes a potentiometer which is responsive to the degree of opening of the control valve, and by combinations of sensing circuits in Wheatstone bridge elements, a variety of automatic control operations can be achieved.

Other patents utilizing the same principle and more elaborate embodiments are shown in U.S. Pat. Nos. 3,054,562 and 4,079,887. All of these prior art patents are directed to a variety of systems which are utilized to control the temperature in buildings utilizing low-pressure steam as a basic heating medium. Another variation is shown in U.S. Pat. No. 4,072,268.

Within this basic prior art, it has long been recognized that systems operating utilizing resistance thermometer principles are exceptionally sensitive and will respond to minute electrical imbalances. As a result, various control systems have been devised operating on electrical bridge principles which have required skilled instrument technicians to insure continuity and stability of operation. However, for successful application to building temperature control, various skills and talents among operating personnel are not common, and such systems must be fabricated, installed and maintained by people who are not generally technically familiar with the intricate operating procedures of such systems.

The prior art U.S. Pat. No. 4,072,268 departs from a system utilizing Wheatstone bridge elements, but utilizes a closed-loop rebalance system having a single open-loop outdoor sensor with many general functional similarities. Its temperature sensor and the rheostat controlled by the valve motor must have substantially linear variable impedance characteristics. As shown in the prior art U.S. Pat. No. 4,072,268, the outdoor sensor is a thermistor 21 having a variable resistor 22 to provide adjustment of the thermistor so that the impedance seen by a control input of an operational amplifier 18 will be linearly variable over the range of temperatures to be sensed. One input to the operational amplifier 18, as shown in FIG. 2, then is the output of the outdoor sensor 20. A second input comes from the rheostat 15 which is responsive to positions of the valve motor. By appropriate gating from timer mechanism 33, the signals are compared by the operational amplifier 18 at certain intervals. The difference signal is fed simultaneously to two comparator circuits 26 and 27 which also receive inputs from variable resistors 39 and 40 to provide reference voltages to those comparators. One comparator 26 is used as a temperature increase comparator such that if the output of the amplifier 18 is above the null condition, the temperature increase comparator will detect that increase and apply a control signal through lamp 28 and triac 29 to effectuate a closing of the valve motor 12. Similarly, a decrease comparator 27 is used to effectuate an increase of the valve motor if the output potential from the operational amplifier 18 is detected to require an increase in the set rate at which heat is supplied to the space.

U.S. Pat. No. 4,072,268 requires a substantial linearity of signals to effectuate a linear output of the amplifier of the control system. Specifically, detailed calibrations of the thermistor 21 are required to match the equivalent impedance characteristic of the rheostat coupled to the control valve. Hence, in order for a simple comparator system to operate as shown in U.S. Pat. No. 4,072,268 to derive a linear output of the comparator amplifier, crucial equivalent impedances must be maintained. Moreover, in a more sophisticated system utilizing a compensator and heat balancer, the requirements of matching impedance will become more difficult to maintain with a system such as U.S. Pat. No. 4,072,268.

Additionally, U.S. Pat. No. 4,079,887 shows a prior art system utilizing low impedance couplings. In such a system, it was necessary to disconnect switch contacts (not shown in the patent) when an indicate circuit was to be connected to any heat sensor, demand sensor or feedback potentiometer. Accordingly, a large number of switch contacts was required to connect and disconnect different coupling circuits to each sensor. Accordingly, calibration of the system was time consuming to achieve, especially in field conditions.

Additionally, in the system shown in U.S. Pat. No. 4,079,887, voltage divider potentiometers were used in series within each temperature sensor bridge leg to select a balance point. Besides this technique, the resulting total imbalance of each indicate and control circuit would be compensated for by an adjustment. This, therefore, resulted in the different adjustments not being made independent of other variables in the circuit. Typical was the voltage divider potentiometer 108 with wiper arm 110 which is in series with the heat balancer elements 104 and 106 and compensating examples 214, 226 and 228, as shown in FIG. 2 of the U.S. Pat. No. 4,079,887.

The prior art U.S. Pat. No. 4,079,887 also required a multitude of control knobs to perform all indicate and compensator functions for the control circuits. For example, a room temperature dial 68 and a compensator dial 66 were used to perform individual temperature, compensation and other indicate functions. The dial 66 was used to determine the valve opening, rate at which heat was being supplied to the zone and compensation positions; while the temperature dial 68 was used to provide a reading of the temperature at the resistance thermometer. Accordingly, a more complicated and, accordingly, more expensive control panel was required.

Accordingly, this invention is a direct improvement of the prior art represented by U.S. Pat. No. 4,079,887.

SUMMARY OF THE INVENTION

Commercial embodiments of all of the prior art devices mentioned have achieved some measure of commercialization. However, substantive areas for improvement remain in this technology. As indicated, the field of use of this technology is generally in boiler rooms, while the sensors themselves are located in the space to be regulated; except when an outdoor selector is used as a demand sensor, its location is on an outside exposure of a wall of the zone under control. Accordingly, while the control panel may be uniformly placed in a boiler room, items such as the demand sensor, heat supply sensor and valve potentiometer are located in individual environments to be controlled, and, therefore, adjustment and calibration become difficult. Additionally, in prior art systems, during the calibration technique, it was necessary to provide switch disconnects to each individual indicate circuit because low impedance couplings were utilized. The present invention solves these problems by using high impedance coupling circuits which act as voltage dividers to obtain the resultant control signal which is fed to the amplifier circuitry.

Additionally, within the prior art systems, calibration took place in the field, wherein each control circuit was individually calibrated by generally offsetting the resulting imbalance of each indicate and control circuit. The present invention overcomes this difficulty by utilizing a single field calibration to balance each sensor bridge leg with a centered bridge leg. Each sensor is centered with a calibration circuit utilizing a bias current which is injected through the bridge leg to cause a greater voltage drop on one side and, therefore, shift the balance point. Prior art systems utilized a voltage divider potentiometer which was in series in each bridge leg to select a balance point. By using the technique of the present invention, individual adjustments can be made on an independent basis irrespective of other variables in the control circuit.

The present invention materially simplifies the circuitry required for indication functions. A single knob is used to indicate all readings in terms of compensation, percent of valve opening, the rate at which heat is being supplied to the zone, and temperature indication. The invention utilizes simple connections to a potentiometer to allow the voltage shift of that indicate bridge leg to duplicate the voltage shift of a sensor bridge leg for heat, temperature or valve indication functions. Each voltage shift is fed to one side of an amplification circuit to be compared to sense a null condition. Prior art systems either had a low impedance coupling between the bridge legs or a potentiometer in the sensor bridge leg to offset resistance changes caused by the sensor. In prior art systems typified by U.S. Pat. No. 4,072,268, substantial linearity was required so that a multitude of indicate and compensation functions could not easily be performed.

Accordingly, it is an object of this invention to provide a temperature control system having high impedance coupling in the control circuits which act as voltage dividers to obtain the required resultant control signal.

It is another object of this invention to provide an improved control system for utilization in low-pressure steam heating units.

Still another object of this invention is to provide a resistance thermometer control network wherein indication circuits can be directly coupled while the control circuit is in operation.

A still further object of this invention is to provide a composite control system for regulating the supply of steam to an area which is to be heated.

Another object of this invention is to provide a system which simplifies control operation by utilizing one knob to perform all indicate functions as well as serving as a compensator in the control circuit.

These and other objects of this invention will become apparent in the following detailed description of the system design in accordance with this invention.

DESCRIPTION OF THE PREFERRED EMBODIMENT

Figure 1:
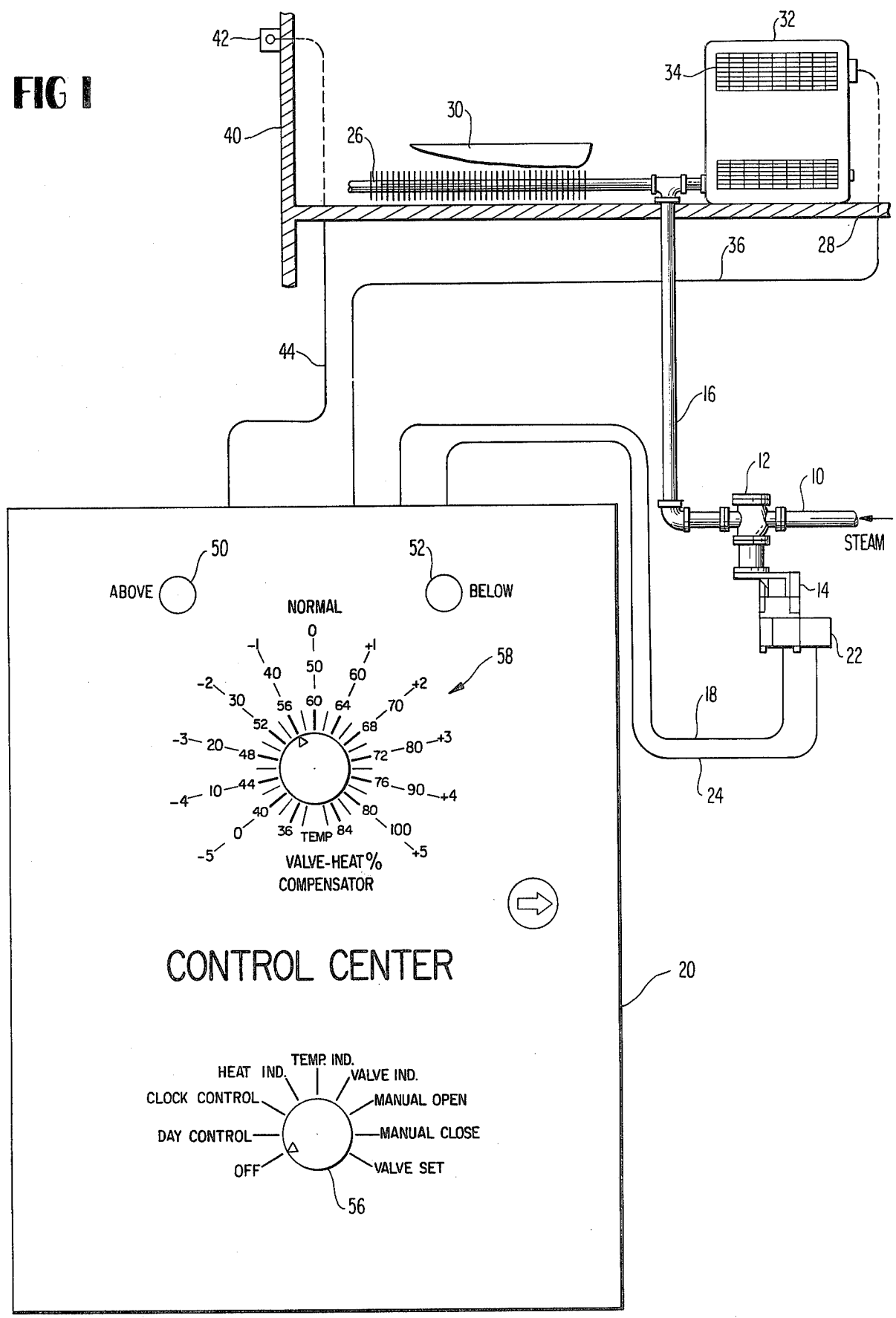
FIG. 1 is a diagrammatic layout of the heating system with the improved control and indicating system of this invention.

Referring now to FIG. 1, a diagrammatic layout of a heating system utilizing the present invention is portrayed. As shown in FIG. 1, these systems are shown to operate utilizing low-pressure steam as the heating media—that is, steam delivered from a boiler or generator (not shown) through a main 10 to a control or reducing valve 12. A motor assembly 14, schematically shown in FIG. 1, is utilized to modulate the position of valve 12 and thereby establish a control flow of steam at reduced pressure through a supply main 16. A first electrical coupling 18 couples the motor assembly 14 to the main control panel 20. Additionally, a valve potentiometer 22 is utilized to indicate the degree of opening or closing of the valve 12. The potentiometer 22 is coupled to the control panel 20 by means of electrical conduit 24.

Steam from the main input 10 is distributed via supply main 16 to a variety of individual radiators in the heating system, shown diagrammatically as element 26 in one space to be controlled. It is appreciated that these radiators are located at points which are remote from the control panel 20, as shown in FIG. 1, for example, by a number of floor separations 28. Additionally, there are outlet traps (not shown) through which condensate and air are drawn out of the radiator in the area to be heated, back through return pipes to an accumulator tank (also not shown). Various configurations of radiators 26 may be utilized, such as an ordinary room radiator or, as shown in FIG. 1, radiator 26 which is disposed in wall 30, partially broken away.

Figure 2:
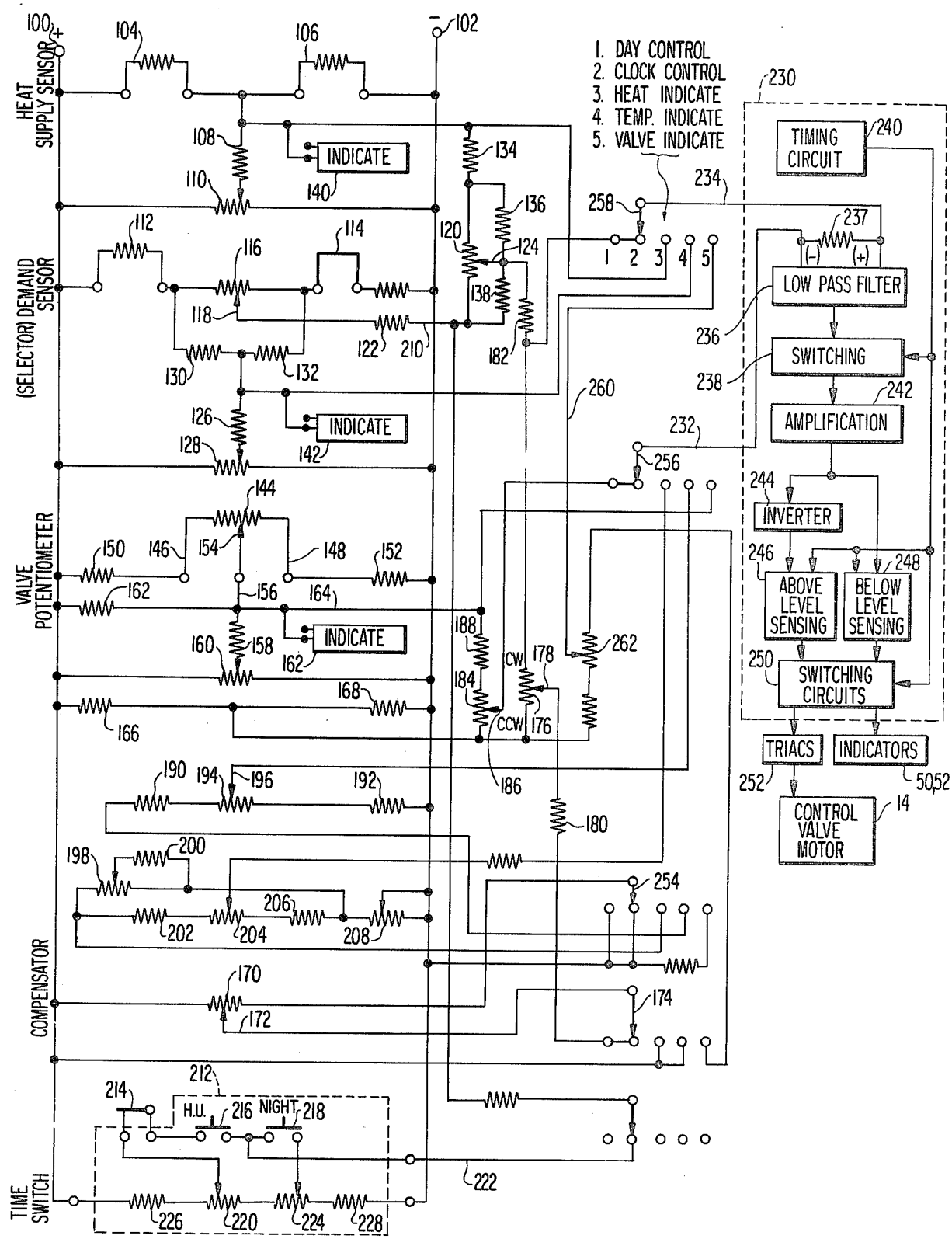
FIG. 2 is a wiring diagram of the control system of FIG. 1.

As shown in FIG. 1, a heat balancer unit 32 is utilized for measuring the heat output of the system. The heat balancer is generally in the form of a small radiating unit in a casing through which air flows out of grill elements 34. Thermostatic elements, as shown in FIG. 2, are positioned in the heat balancer and are coupled to the control panel 20 by means of electrical cable 36. An outdoor selector 42 is mounted on wall 40 and coupled to the control panel by means of coupling 44. The interaction of these elements—namely, the heat balancer, the valve potentiometer and the outdoor selector—will be discussed in detail herein. Also, it should be noted that although a demand sensor disposed outside the room to be controlled is utilized for purposes of discussion, a conventional window selector such as shown as element 42 in U.S. Pat. No. 4,079,887 or various methods of sensing room temperature can be utilized. The combination of the heat balancer and the outdoor selector, even when assuming locations differing from what is illustrated in FIG. 1, serve to provide sensor functions for the demand and supply of heat.

As typified in the prior art U.S. Pat. No. 4,079,887, this control system in its most basic terms, as shown in FIG. 1, is used to regulate the supply of heat through the main 16 by controlling the admission of low-pressure steam through the control valve 12. Control panel 20 is the central control operating station for the system as shown in FIG. 1, and it contains settings which are made to define various control modes. Also, indications of outdoor temperature, control valve opening and the rate of heat supply may also be taken from the control panel 20. Two indicating lamps 50 and 52 are provided to define upper and lower limits used to sense a null condition which indicates the temperature or condition to be sensed existing in the zone under control. A master switch 56 is provided on the control panel, and is the control selector switch having nine stations enabling the system to be set to perform any of five control functions or three indicate functions. The final control switch position is the OFF condition in which all control and indication functions are inoperative, and the control valve 12 will remain in the position it was at the time the master power switch 56 is turned OFF.

The control panel 20 utilizes a second panel knob 58 which is used to provide temperature readings on the inner scale, percentage of valve opening on the center scale and compensator readings on the outer scales. The functions of those positions of the master switch 56 will now be described.

As indicated, in the OFF position, all control and indication functions are inoperative, and the control valve will remain in the position it was at the time the master switch was turned in OFF. Power is maintained at the temperature sensor 42 so that a warm-up period will not be needed for the accuracy of control or indication with functions when the system is switched back on.

In the DAY CONTROL function, the rate of steam supply is regulated by maintaining a balance between heat demand as measured by the selector 42 and the heat supply as measured by the heat balancer 32. Additionally, the heat supply may be varied by setting the dial knob 58 to perform a compensation function.

During the DAY CONTROL mode, the system, as will be described in FIG. 2, will, on a cyclic basis, generally three times per minute, check to see if the heat supply is balanced with the heat demand. The indicating lamps 50 and 52 will indicate whether the opening of the control valve 12 is ABOVE or BELOW that necessary to maintain a balance between heat demand caused by weather variations as measured by sensor 42 and the heat supply as measured by the heat balancer 32. The control valve 12 will be moved in the appropriate direction to balance heat supply and demand. For example, if the BELOW lamp 52 will light up, the opening of the control valve 12 is less than that necessary to maintain a balance between the heat demand and heat supply, so the valve will be opened a small amount to achieve a null condition. If the ABOVE lamp 50 lights up, then the opening of the control valve is greater than that necessary to maintain a balance between heat demand and heat supply. The control valve will, accordingly, be closed to achieve a null condition. If neither of the indicating lamps 50 or 52 light up, then the system is in balance and the control valve is correctly positioned to maintain a balance between heat demand and heat supply. Hence, the valve 12 will remain at whatever position it has been placed by previous sensed conditions. As will be explained herein, this checking of the sensors by the control circuit shown in FIG. 2 is made generally at the rate of three times per minute to insure that opening of the valve is sufficient to maintain a balance between demand and supply.

In cases of unusual weather conditions—that is, in high wind or sun conditions—which would tend to distort the readings of the selector 42, the compensator dial knob 58 may be utilized to change the rate of heat supply to the building during those conditions. Once temperatures reach a satisfactory range, the compensator would be set to a zero position—that is, with the knob vertical such that a zero or normal level of no compensation is used in the system.

Under clock control, the operation of the controls are automatically transferred for three periods of heating, day, night and heat-up, in accordance with a time schedule utilizing a time switch mechanism (not shown). The time switch is shown as element 58 in the prior art U.S. Pat. No. 4,079,887, and its operation is well known. If no time switch is associated with this system, the function under clock control would be the same as under DAY CONTROL.

If a time switch is utilized during the first period—that is, DAY—the steam supply would be regulated by maintaining a balance between the heat demand as measured by the selector 42 and the heat supply as measured by the balancer 32. The heat supply is varied by setting the compensator knob 58, and, accordingly, the operation is the same as attained when the master switch 56 is set to DAY CONTROL. During the night period, the steam supply is regulated by the same controlling devices as used in control of the day period, except that the night adjustment utilized in the time switch will decrease the rate of heat supply to give a lower controlling temperature. This will be explained in greater detail with respect to the circuit shown in FIG. 2.

During the heat-up period, steam supply is also regulated by the same controlling devices used to control the system during the day period, except that during this mode of operation, an increase in the rate of heat supply is made. It should be noted that variations of this system can use additional sensors for controlling during night and heat-up periods, then those which control for the day period.

In the HEAT INDICATE mode, the percentage of heat emission from the heat balancer 32 is read directly from the percent scale, the center scale about the knob 58. By moving the knob 58 until neither the ABOVE or the BELOW indicate lamps light up, the percentage will be read directly. Hence, at the setting where the lamps are balanced—that is, the null point—the knob pointer will indicate the relative percent of heat output in the heat balancer 32.

In the TEMPERATURE INDICATE function, the temperature of the demand sensor, such as an outdoor selector 42, may be read directly from the temperature indication dial by moving the knob 58 until neither of the indicating lamps 50 or 52 light up.

The VALVE INDICATE function is used to measure the opening of the control valve 12 in percentage figures by moving the knob 58 until neither of the indicating lamps 50 or 52 light up. The reading on the center scale then denotes the valve position.

The MANUAL OPEN and MANUAL CLOSE functions are used to continuously open or close the control valve 12. In the MANUAL OPEN function, the control valve motor 14 is driven directly from the master switch, and the indicate lamps 50 and 52 may be used to find a moving null point—that is, to track changing valve position if desired. The converse is true in the MANUAL CLOSE mode wherein the valve motor 14 is used to continuously close the control valve 12.

Finally, in the VALVE SET position, the control valve 12 is positioned in a series of steps corresponding to the percentage of opening for which the compensator knob is set on the valve percentage dial scale shown with knob 58. At a repetition rate of approximately three times per minute, the opening of the control valve is corrected until the desired opening is attained.

Referring now to FIG. 2, the various bridge circuit elements are shown together with those elements and components to achieve the desired control functions. The circuit shown in FIG. 2 should be contrasted with that shown in U.S. Pat. No. 4,079,887 for the specific improvements which will be discussed herein. A source of direct current power, typically a rectifier bridge interposed between an AC power source, is used to provide full-wave rectification and achieve direct current through positive lead 100 and negative lead 102.

A first leg of the bridge is formed by the heat balancer resistances which form the heat supply sensor contained within unit 32 shown in FIG. 1. A hot-air temperature resistance 104 or an upper sensor is coupled to a cold-air resistance 106 or a lower sensor resistance. In contrast to the prior art U.S. Pat. No. 4,079,887 which utilized a center adjustment potentiometer formed by resistance 108 with contact 110, the present invention utilizes high impedance couplings and is centered with a calibration circuit shown in FIG. 2. In this invention, a bias current is injected by resistances 108 and 110 through the bridge leg to cause a greater voltage drop on one side and, therefore, shift the balance point. This is contrasted with the voltage divider potentiometer 108 in the prior art U.S. Pat. No. 4,079,887, which is disposed in series with the upper and lower resistances 104 and 106 and is used to select a balance point. Within the prior art, the resulting total unbalance of each indicate circuit—that is, for example, with respect to the heat balancer circuit—would have to be compensated for because potentiometer 108 was used to match the heat balancer bridge leg with the selector bridge leg for making adjustment 118 independent of adjustment 124. Accordingly, an adjustment of the heat balancer could not be made independently of other variables in the circuit. In this invention, a bias current is injected by resistance 110 through resistance 108, causing the current through element 104 to be greater than through element 106 (or vise-versa), attaining a greater voltage drop on one side of the leg to therefore shift the balance point. Hence, the resistance 110 with the wiper element as shown in FIG. 2 is the centering adjustment for the heat balancer unit 32.

The resistances forming the demand sensor arm of the bridge network are formed by elements 112, typically located as an outdoor selector, together with a shunt 114 separated by a Mild-Weather Adjustment resistance 116 with contact arm 118. The contact 118 is coupled via resistance 122 to resistance element 120 which, with wiper 124, forms a Cold-Weather Adjustment for the control circuit. Wiper 124 is calibrated in degrees of change in the temperature difference between the heat balancer coils per degree of change at the demand sensor 42.

As in the case of the arm utilized for the heat balancer, the bridge arm for the demand sensor 42 utilizes a bias current injected by resistances 126 and 128 to cause a greater voltage drop on one side and, therefore, shift the balance point. A pair of resistances 130 and 132 are employed to insure that the signal from the wiper arm of 128 is fed to the center of the demand sensor bridge leg.

As shown in FIG. 2, a voltage divider formed by resistance 120 with wiper arm 124 is used between the heat supply sensor 32 and the demand sensor 42. In prior art systems, such as element 120 in U.S. Pat. No. 4,079,887 this has always been a low impedance coupling. This required a switch contact to disconnect the divider when an indication was to be made in that circuit. With the present invention, indication circuits can be connected while the control circuit is in operation because each bridge leg voltage cannot be shifted by the current flowing from a different leg. Four resistors disposed about the voltage divider 124 provide the necessary characteristic scale and range. These are resistors 134, 136, 138 and the previously-recited resistor 122. Resistors 134 and 122 also function to maintain the high impedance characteristic of the coupling at any setting of wiper 124. As shown in FIG. 2, various indicate operations, such as by a voltage sensing indicate connection 140 coupled to the supply sensor, and an indicate connection 142 coupled to the demand sensor, can be selectively coupled into the system without disrupting the control circuit signal.

The position of the valve 12 is a crucial aspect in the control of heat systems of this general type. Resistance 144 of the valve potentiometer 12 is coupled by leads 146 and 148 to a pair of resistances 150 and 152. Operation of the valve motor 14 to regulate the opening and closing of the valve is electrically sensed by valve position sensor 154 formed on lead 156. In correspondence with the improvement which this invention defines, resistances 158 and 160 are used to inject a bias current through the bridge leg of the valve potentiometer to shift the balance point. This allows an independent calibration to be performed at the panel 20 without adding an adjustable resistance in series with 150 or 152, whch are sometimes external to the panel in a terminal box near the valve.

To maintain the wiper arm centered on adjustment potentiometer 160, a resistor 162 is employed on lead 164 to shunt the left side of the bridge such that when the valve is at the 0% position, it will result in the output signal from this bridge leg being centered. Hence, the adjustment 160 will remain centered if the installation does not have any unbalanced factors.

As indicated, this invention utilizes high impedance couplings in the control circuit and, therefore, eliminates the need for control circuit balancing in field operation. Hence, the minimization of required calibrations occurs which is an important benefit in improvement of this technology. In this system, each sensor bridge leg is only field calibrated once to balance with a centered bridge leg defined by resistances 166 and 168.

Resistor element 188 together with resistance 184 form a voltage divider which isolates the valve potentiometer's control signal output from the indication signal output. Adjustable contact 186 on resistance 184 selects a percentage of the valve feedback signal to be used in the control circuit to balance with the composite of the other control input signals. This will be explained in detail with respect to the operation of the system shown in FIG. 2.

To briefly reiterate the function of the resistance 184 with adjustable contact 186, this is a throttling differential adjustment for the control circuits. The setting of the adjustment of wiper 186 on resistance 184 will determine the amount of the control system will change the opening of the control valve 12 if the temperature difference between the heat balancer coils 104 and 106 varies from the value corresponding to the rate of heat supply required by the selector 112. The calibrated scale for the adjustment 186 therefore generally refers to the relative change in the temperature difference between the heat balancer coils required to result in a given change in the control valve opening.

The compensator arm 170 has a wiper element 172 coupled to switch element 174 at the second terminal, indicative of clock control operation. Compensator function is this mode of operation is formed by using a range adjustment resistance 176 and associated wiper arm 178. It should be noted that resistance element 176 coupled with resistors 180 and 182 form a voltage divider with characteristics for the desired range of effect on the control circuit. If adjustment 178 is turned to the counterclockwise end of resistance 176 as shown in FIG. 2, the compensator will be given a slight negative effect on the control circuit by shifting the voltage sensed at resistor 184 and wiper element 186. Therefore, a setting of the range adjustment of resistor 176 to completely null out the effect of the compensator is possible at a position which would be slightly clockwise of the extreme counterclockwise position.

As shown in FIG. 2, simple connections to the potentiometer 170 and wiper arm 172 are used to allow the voltage shift of that bridge leg to duplicate the voltage shift of a sensor bridge leg for heat, temperature or valve indicate functions. For a temperature indication function, the compensator 170 is coupled to a bridge leg comprising resistors 190 and 192 with adjustment 194 and wiper arm 196 to form a bridge leg which duplicates the voltage shift for that particular sensor.

A heat indicate range adjustment 198 is used to match the heat percentage dial shown in FIG. 1 with the normal range of the heat output in the heat balancer 32. This circuitry is a material improvement over prior art systems. Instead of taking a percentage of the voltage shift of the compensator, the adjustment 198 varies the total impedance of the compensator leg. Resistor 200 gives the characteristic range desired to adjustment 198.

The resistor network comprising resistors 202, 204, 206 and 208 are used in the heat indicate function. The trimmer 204 is used to make adjustment 198 independent of the set adjustment 208 for the heat indicate circuit.

FIG. 2 shows schematically the functions of the time switch elements which function substantially the same as the elements shown in the clock circuitry arm of the prior art U.S. Pat. No. 4,079,887. One important difference is that the clock compensation circuit, when used for night control or heat-up control, will shift the control signal from the demand sensor shown on line 210 instead of shifting the composite signal from all of the control bridge legs. This improvement keeps the relative effect of the compensator and each sensor the same for each phase of heating. Accordingly, the control circuit is made to "think" that the demand sensor is warmer or cooler than it actually is by the time switch circuitry.

As shown in FIG. 2, the contacts used in the time switch for night operation and heat-up are surrounded by the dotted line box 212. Switch 214 is a thermostat which opens when a maximum heat-up temperature is obtained in the space under control. During the day period of operation, heat-up switch 216 and night control switch 218 will remain open so that no output from the time switch will be utilized.

The heat-up period of control is initiated by closure of the contact 216, and, hence, the output lead 222 will be coupled through thermostat 214 to the heat-up compensating resistance 220. The compensating adjustment 220 is utilized to set the amount of the increase in the rate of heat supplied to the space during the heat-up period. The higher the setting on adjustment 220, the more heat will be supplied to match the demand called for by the demand sensor 42. Switch 216 or thermostat 214 will automatically discontinue the heat-up operation at the time required to return to day control.

The night period of control is initiated by closure of contact switch 218, thereby coupling output 222 to compensating resistance 224. Adjustment 224 sets the amount by which the heat supply is reduced at night from the basic day control heating temperature. The higher the setting on adjustment 224, the greater the reduction in heat. Balancing resistors 226 and 228 form the remainder of the clock arm of this bridge network.

The system will now be described in terms of the clock control function, function 2, as shown in FIG. 2, which is the normal mode of operation. As previously indicated, clock control is the same as day control if no time switch is used in the system.

As shown in FIG. 2, two inputs to the amplification circuit portion of the system 230 derive from contacts in the second position—that is, in the clock control position. This would occur when the knob 56 is set to CLOCK CONTROL. Two inputs, a positive input and a negative input, are provided. The negative input, indicative of the valve opening signal, is derived on line 232 as the output from wiper arm 186 on resistor 184. As indicated, resistor 184 is the differential adjustment for the control circuits, and the setting determines the amount the control circuit will change the opening of the control valve if the temperature difference between the heat balancer coils varies from the amount corresponding to the rate of heat supply called for by the selector. Accordingly, the output along line 232 is the input of the percentage of valve opening as adjusted.

The positive input to the amplifier circuit during clock control is the composite output on line 234 from resistor 182. The resistor 182 provides an output which is a mixed signal from resistor 176 when the compensator is not centered and from the high impedance output of voltage divider 124. The positive signal on line 234, therefore, is the imbalance between the heat supply and the demand as modified by any compensating adjustment. The circuitry which comprises the amplifier circuit 230 is well known and forms no part of this particular invention. Essentially, the two inputs are delivered to a low-pass filter 236 which comprises a capacitor/resistor network. The signals are mixed across an input resistor 237 to the low-pass filter and are delivered to a switching section 238. The switch section 238 is operative by means of a timer 240 to selectively gate the output of the low-pass filter at a known repetition rate. In essence, the low-pass filter is used to derive an output which charges a capacitor which will be discharged whenever the switch is closed. The output is then fed to an amplification stage 242 which is subsequently split and sent to two ABOVE and BELOW level sensing circuits. One output is inverted by means of inverter 244 and supplied to the ABOVE level sensor 246, while the direct output of the amplification stage 242 is sent to the BELOW level sensor 248. The ABOVE and BELOW level sensing circuits take the form of two parallel Schmitt triggers which, when the output of the amplification or inverter stage is above a threshold level, will fire, thereby sending an actuating pulse to a switching circuit 250. The switching circuits comprise conventional logic networks which are used to actuate two triacs 252 together with indicators 50 and 52 to provide an ABOVE or BELOW indication. The output of the triacs 252 is used to drive the control motor 14 in either an opening or closing mode. Accordingly, it can be seen that the two inputs, one a mixed input of the demand and the other a percentage of the valve opening signal, are fed to the amplifier circuit for appropriate signal processing and used to derive an output for valve motor control.

If, for example, an indication function is to be performed, the control knob 56 will be placed at either a heat indicate, temperature indicate or a valve indicate function which would move the wiper arms 174, 254, 256 and 258 each to the appropriate position 3, position 4 or positions 5. For example, for a valve indication function, the positive input along line 234 would be coupled to line 260 through switch 258 and to range adjustment resistance 262. Adjustment 262 is used for matching the range of the valve percentage dial scale with that of the control valve. Hence, that adjustment gives a percentage of the compensator output as it is compared with the centered bridge leg comprised of resistors 166 and 168. The negative input along line 232 would be coupled through switch 256 to sense the voltage on line 164 which is directly indicative of valve position from the setting of pot 154.

As shown in FIG. 2, when switch 174 is placed in the fifth position, adjustment of the compensator knob 58 moves wiper 172 and allows the voltage shift in that bridge leg to duplicate the voltage shift of the valve potentiometer sensor. When a null condition exists—that is, when neither of the indicators 50 and 52 light up—the percentage read out on the center scale surrounding knob 58 will indicate the valve position.

Accordingly, by the use of high impedance coupling and the improved calibration circuits, material improvements in the control system result. Additional improvements occur as a result of the simplification of the control panel to perform various composite functions. Many variations will be apparent to those having ordinary skill in the art which will not depart from the spirit of this invention.

I claim:

1. In a balanced bridge control system for controlling the temperature in a space, said system having a source of heat and means to vary the rate at which heat is supplied, sensor means on a first bridge leg to determine the supply of heat to the space, sensor means on a second bridge leg to determine the demand for heat and a control circuit to alter the rate at which heat is supplied in response to the demand and supply sensor means, the improvement comprising high impedance coupling means for connecting said first bridge leg and said second bridge leg to said control circuit.

2. The control system of claim 1 wherein said high impedance coupling means comprises a voltage divider between the demand sensor means and the supply sensor means.

3. The control system of claim 1 further comprising a centered bridge leg, said centered bridge leg functioning to provide a constant calibration point for each leg in said bridge circuit.

4. The control system of claim 1 wherein said control circuit includes means for compensating for the rate at which heat is supplied.

5. The control system of claim 4 wherein said means for compensating is selectively coupled to said bridge legs to duplicate the voltage shift in a respective sensor.

6. The control system of claim 5 further including a control sensor forming a third bridge leg, said control sensor coupled to said means to vary the rate at which heat is supplied and producing an output voltage indicative of said rate, said compensating means being selectively coupled to said control circuit to duplicate the voltage of said control sensor.

7. The control system of claim 6 further comprising means to display the setting of said compensating means.

8. The system of claim 1 wherein said control circuit includes means to indicate whether the temperature of said space is above or below a preselected value.

9. The system of claim 1 wherein said sensor means to determine the demand for heat comprises a temperature-sensitive resistance disposed outside the space to be controlled and responsive to changes in outside temperature.

10. The system of claim 1 further comprising a control sensor forming a third bridge leg and coupled to said means to vary the rate at which heat is supplied, and a calibration circuit means for injecting a bias current in said third bridge leg to shift the balance point thereof.

11. The system of claim 10 further comprising additional calibration circuit means associated respectively with said supply sensor means and said demand sensor means to shift their respective balance points.

12. The system of claim 10 further comprising means to indicate the voltage across any of said first, second or third bridge legs.

13. The system of claim 10 further comprising a voltage divider substantially isolating said derived control sensor output signal from the indicate signal output of the third bridge leg.

* * * * *